2,851,470

SYNTHESIS OF STEROIDS

Patrick A. Diassi, Westfield, and Josef Fried, New Brunswick, N. J., assignors to Olin Mathieson Chemical Corporation, New York, N. Y., a corporation of Virginia No Drawing. Application June 21, 1957
Serial No. 667,288

4 Claims. (Cl. 260—397.3)

This invention relates to the synthesis of valuable steroids; and has for its object the provision of (I) an advantageous process of preparing the physiologically active steroid, 12α-bromo-11-keto-progesterone, and of (II) 4β,12α-dibromopregnane-3,11,20-trione, an intermediate useful in the preparation of said active steroid.

The process of this invention essentially comprises treating 12α-bromopregnane-3,11,20-trione with bromine in an acidic medium to form the new intermediate of this invention, 4β,12α-dibromopregnane-3,11,20-trione, and reacting this intermediate with a lithium halide in an organic solvent of high dielectric constant, such as dimethylformamide, to yield 12α-bromo-11-ketoprogesterone.

The following examples illustrate the invention (all temperatures being in centigrade):

EXAMPLE 1.—4β,12α-DIBROMOPREGNANE-3,11,20-TRIONE (a) 12α-bromopregnane-3,11,20-trione To a stirred solution of 12α-bromopregnane-3α-ol-11,20-dione (339 mg.) in acetone (reagent grade) (12 ml.) a solution of chromic anhydride (91 mg.) and sulfuric acid (184 mg.) in water (3 ml.) is added dropwise. After 30 minutes the excess oxidizing reagent is reduced to the trivalent form with ethanol and the precipitated chromic sulfate is filtered and washed with acetone. The filtrate is diluted with water (10 ml.) and the solution concentrated in vacuo. Crystals of 12α-bromopregnane-3,11,20-trione separate and are filtered, washed with water and dried. Yield about 271 mg., M. P. about 178–180°. Recrystallization from ethanol gives material melting at about 186–188°;

$\lambda_{max.}^{Nujol}$ 5.84–5.88$\mu$

Analysis.—Calcd. for $C_{21}H_{29}O_3Br$ (409.36): C, 61.61; H, 7.14; Br, 19.52. Found: C, 61.21; H, 6.98; Br, 19.66.

(b) 4β,12α-dibromopregnane-3,11,20-trione

A solution of 12α-bromopregnane-3,11,20-trione (199 mg.) in glacial acetic acid is treated dropwise with a solution (0.72 ml.) of bromine (112 mg./ml.) in acetic acid after priming with a few drops of 11% HBr in acetic acid. The solution is then poured into cold water (30 ml.) and the precipitate filtered and washed with water, 5% sodium bicarbonate and then water again. Recrystallization from ethanol gives pure 4β,12α-dibromopregnane-3,11,20-trione about (200 mg.) melting at about 164–165°;

$\lambda_{max.}^{Nujol}$ 5.79, 5.86$\mu$

Analysis.—Calcd. for $C_{21}H_{28}O_3Br_2$ (488.27): C, 51.65; H, 5.78; Br, 32.74. Found: C, 51.71; H, 5.61; Br, 34.00.

EXAMPLE 2.—12α-BROMO-11-KETO-PROGESTERONE

A solution of 4β,12α-dibromopregnane-3,11,20-trione (5.80 g.) and lithium chloride (1.90 g.) in dimethylformamide (75 mg.) is heated on a steam bath for 3 hours. It is then concentrated in vacuo to about 40 ml. and water (15 ml.) is added to the hot solution. On cooling, crystalline needles separate which are filtered, washed with water and dried. Weight about 2.59 g., M. P. 165–167°; $[\alpha]^{24}_D$ +82.4° ($CHCl_3$);

$\lambda_{max.}^{methanol}$ 237m$\mu$($\epsilon$=15,200); $\lambda_{max.}^{Nujol}$ 5.85, 6.00, 6.18$\mu$ The properties of the above sample are identical with that of an authentic sample of 12α-bromo-11-ketoprogesterone.

The invention may be variously otherwise embodied within the scope of the appended claims.

What is claimed is:

1. 4β,12α-dibromopregnane-3,11,20-trione.

2. A process for preparing 4β,12α-dibromopregnane-3,11,20-trione, which comprises treating 12α-bromopregnane-3,11,20-trione with bromine in an acidic medium and recovering the 4β,12α-dibromopregnane-3,11,20-trione formed.

3. A process for preparing 12α-bromo-11-ketoprogesterone, which comprises treating 4β,12α-dibromopregnane-3,11,20-trione with lithium halide in an organic solvent of high dielectric instant and recovering the 12α-bromo-11-ketoprogesterone formed.

4. The process of claim 3 wherein the lithium halide is lithium chloride and the solvent is dimethyl formamide.

No references cited.